(12) United States Patent
Karthikeyan et al.

(10) Patent No.: US 10,628,720 B2
(45) Date of Patent: Apr. 21, 2020

(54) REMOTE MONITORING AND CONTROLLING PHYSICAL PARAMETERS OF A MATERIAL UNDER TRANSPORTATION

(71) Applicant: Council of Scientific & Industrial Research, New Delhi (IN)

(72) Inventors: Muthukumarasamy Karthikeyan, Pune (IN); Renu Vyas, Pune (IN)

(73) Assignee: COUNCIL OF SCIENTIFIC & INDUSTRIAL RESEARCH (IN)

( * ) Notice: Subject to any disclaimer, the term of this patent is extended or adjusted under 35 U.S.C. 154(b) by 0 days.

(21) Appl. No.: 16/091,130

(22) PCT Filed: Apr. 4, 2017

(86) PCT No.: PCT/IN2017/050130
§ 371 (c)(1),
(2) Date: Oct. 4, 2018

(87) PCT Pub. No.: WO2017/175243
PCT Pub. Date: Oct. 12, 2017

(65) Prior Publication Data
US 2019/0156166 A1 May 23, 2019

(30) Foreign Application Priority Data
Apr. 4, 2016 (IN) .............................. 201611011757

(51) Int. Cl.
G06K 19/06 (2006.01)
G06Q 10/08 (2012.01)

(52) U.S. Cl.
CPC . G06K 19/06028 (2013.01); G06K 19/06037 (2013.01); G06Q 10/083 (2013.01); G06Q 10/0832 (2013.01)

(58) Field of Classification Search
CPC ... G06K 19/00; G06Q 10/087; G06Q 10/0875
(Continued)

(56) References Cited

U.S. PATENT DOCUMENTS 5,965,410 A 10/1999 Chow et al.
6,525,660 B1 * 2/2003 Surintrspanont ...... A23G 9/503
235/375

(Continued)

FOREIGN PATENT DOCUMENTS

WO 2014187484 11/2014
WO 2016106292 6/2016

OTHER PUBLICATIONS

Cal et al., An intelligent transportation system for hazardous materials based on the Internet of Things, (ISBN No. 978-94-6252-112-4), presented at International Conference on Information Technology and Management Innovation. 2015. CN.

(Continued)

*Primary Examiner* — Daniel St Cyr
(74) *Attorney, Agent, or Firm* — The Belles Group, P.C.

(57) ABSTRACT

An Internet of Things (IoT) based system for remotely monitoring and controlling various physical parameters for chemical/biological material under transportation in a container is disclosed herein. Due to various circumstances, wither hazardous or infectious, taking proper measures becomes a necessary condition while transporting chemical or biological materials. The sensors attached to the container measure the associated physical parameters and send the data to a remote control system. The dynamic barcode responds to the change in any of the parameters and changes its patterns accordingly. The remote server, based on the received data, instructs a controlling system to control the parameters, thus maintaining the health of the material.

9 Claims, 9 Drawing Sheets (58) Field of Classification Search
USPC .......................... 235/494, 385, 454, 462.01
See application file for complete search history.

(56) References Cited

U.S. PATENT DOCUMENTS

| | | |
|---|---|---|
| 7,149,658 B2 | 12/2006 | Kadaba |
| 7,527,198 B2 * | 5/2009 | Salim ................ G06K 17/0022 235/378 |
| 8,042,741 B2 * | 10/2011 | Shadwell, Jr. ... G06K 19/06112 235/454 |
| 8,461,958 B2 | 6/2013 | Saenz et al. |
| 9,225,793 B2 | 12/2015 | Dutta et al. |
| 2010/0078482 A1 | 4/2010 | Bradford |
| 2013/0271290 A1 | 10/2013 | Saenz et al. |
| 2016/0292486 A1 | 10/2016 | Prusik et al. |

OTHER PUBLICATIONS

International Search Report for Corresponding Application No. PCT/IN2017/050130, dated Aug. 16, 2017. WO.

* cited by examiner

REMOTE MONITORING AND CONTROLLING PHYSICAL PARAMETERS OF A MATERIAL UNDER TRANSPORTATION

CROSS-REFERENCE TO RELATED PATENT APPLICATIONS

The present application is a U.S. national stage application under 35 U.S.C. § 371 of PCT Application No. PCT/IN2017/050130, filed Apr. 4, 2017, which claims priority to Indian Application No. 201611011757, filed Apr. 4, 2016, the entireties of which are incorporated herein by reference.

FIELD OF THE INVENTION

The present invention is directed to an Internet of Things enabled method, device and system for remote monitoring and controlling physical parameters of a material. The invention may be advantageously used for remote monitoring and controlling physical parameters of chemical and biological samples under transportation and/or storage.

BACKGROUND AND PRIOR ART OF THE INVENTION

Transportation of biological/chemical materials is a critical task. The chemical materials carry the risk of being flammable, explosive and corrosive and so on. When exposed, these materials may cause hazards, either to humans or environmental or both. Biological materials may be of several kinds: infectious and affecting humans or animals, clinical specimens, medical waste etc. when exposed, the infectious biological materials are capable of causing temporary or permanent disability, life threatening or fatal disease to humans or animals. Under these circumstances, taking proper measures becomes a necessary condition while transporting chemical or biological materials.

The national or international agencies have prescribed categories and guidelines for packing and transporting such materials. The materials may be sent by cargo aircraft, by road transport, by courier or by post. In any case, the packaging must meet classification and labeling requirements.

In addition to ensuring that the material being transported is appropriately packaged (i.e. as per the requirements of the transporter or as per government norms or as per industry norms, as the case may be), there has been a growing need to transport chemical or biological materials under controlled environment.

In this direction, U.S. Pat. No. 5,965,410 (hereinafter US'410) discloses methods and devices for controlling process parameters such as fluid temperature, concentration and the like of material (e.g., fluid) in a microfluidic system. US'410 mention use of heating elements which typically include external resistive heating coils. The method disclosed in US'410 applies a selectable current through a fluid and controls the current to elevate the temperature of the system.

Similar need had arisen in the field of cargo shipment to preserve the health of the goods. Internet of Things technology has been effective in providing answers to the problems in this field. Internet of Things is a network of physical objects that communicate and share the data remotely over a network.

U.S. patent application publication number US20130271290 discloses an apparatus and a method for controlling cargo parameters in a microenvironment of a shipping container during transit. The system comprises a sensor which measures a cargo parameter, surrounding or within the container, during the transit; a module device coupled to the sensor, receiving cargo parameter from the sensor during transit; a remote device coupled to the module device. The module device herein is configured to modify or control the refer parameter during transit based on the cargo parameter. The remote device may be smartphone, laptop, desktop, kiosk or a cloud computing services that are delivered as a service over the Internet.

U.S. Pat. No. 8,461,958 discloses systems for monitoring and control of various conditions in transport containers. The system comprises a microprocessor unit coupled to a first bidirectional communication port for communication with a container's controller disposed inside the container; a global positioning module for determining a location of the container; a transceiver of local wireless communication; a transceiver of long-range wireless communication; and means for monitoring and controlling communication. The GPS and the transceivers are controlled by the microprocessors. The system may also act as a detachable unit.

According to a recent study, 25 billion Internet of Things (IoT) devices are expected to be in market by 2020 out of which at least 5% of the market will be in the field of sensor based technologies. There is a need for continuous monitoring of temperature, light, sound, vibration etc. while transporting sensitive biological materials or high energy materials over a period of time.

U.S. Pat. No. 9,225,793 refers to accessing sensor data from sensor nodes in a sensor network and aggregating the sensor data for communicating to an indexer.

Recent research show vast applicability of the IoT technology in the field of transportation of chemical and biological materials. Paper presented at "International Conference on Information Technology and Management Innovation" entitled "An intelligent transportation system for hazardous materials based on the Internet of Things" by "Liming Cal, Wu Xia, Peng Li, Long Zhang, Jing Liu" (ISBN No. 978-94-6252-112-4) discloses a transportation system which does following functions: parameters collection, information management, intelligent alerting and rescue dispatch. The system consists of vehicle terminal system, wireless communication system and monitoring center system. Vehicle terminal system is responsible for data collection; Wireless communication system is responsible for packaging the data and sending the data to the monitoring center via TCP/IP protocol; Monitoring center system is responsible for information analysis and management, intelligent alerting and rescue dispatch.

Along with monitoring of the system and sending data to the monitoring center, few systems employ visual or audio-visual indicator for indicating change in the environmental parameters being monitored. Such indicators may be an LED or a barcode. In systems containing LED, such as demonstrated in U.S. Pat. No. 7,149,658, the LED illuminates in response to the environment condition to which the product is subjected transcending a limit.

In systems involving barcode, usually the barcode is dynamic which changes its pattern in response to the change in environment conditions.

PCT publication number WO2016106292 discloses an apparatus for cold chain monitoring of perishable goods which comprises environmental sensor to monitor at least one environmental parameter; a controller to log a plurality of readings from each of the at least one environmental sensors; and a machine readable display to display at least one alarm status associated with the readings via a barcode. The barcode in the said patent document may be one-dimensional or two-dimensional, and has static portion and a dynamic portion associated with the readings. Two dimensional barcode symbologies may include data matrix, Maxi-Code, PDF 41, PDF 417 Truncated, QR Code, Codablock F, Aztec Code, etc.

U.S. patent application publication number US20160292486 claims methods and apparatus for providing and reading 2D barcodes that include dynamic environmental data, where modules of the barcode may change state in response to environmental conditions. The sensor information may be of an environmental, physical or biological nature, and records a change in status of the environmental or biological condition to which the labeled product has been exposed. Sensor dye chemistry is employed and when a specified condition of the sensed property occurs it causes a change in the color state of sensor dye modules embedded within the sensor-augmented two-dimensional barcode, encoding sensor digital information. The barcode comprises of a substrate, a two-dimensional error-correcting barcode symbol provided on the substrate, a first layer provided on the substrate in a permanent color state; and a second layer provided on the substrate. The second layer contains a chemical dye that is responsive to the occurrence of an environmental, physical or biological condition, thereby resulting in changes in colour when such condition occurs. The two-dimensional error-correcting barcode symbol may be Data Matrix, QR Code, Aztec Code, MaxiCode, PDF417 and Dot Code symbologies.

U.S. patent application publication number US20100078482 pertains to a barcode display and reader which can be used to transfer dynamic information. A dynamic barcode system includes a microprocessor connected to a sensor or group of sensors. The microprocessor connects to a barcode display. Data collected by the sensor or group of sensors is processed by the microprocessor and sent to the barcode display. A barcode reader reads the barcode display. The barcode display, microprocessor and group of sensors are arranged on a packet which is attachable to a specimen to be monitored. The barcode reader has an infrared transmitter for sending a signal to an infrared receiver associated with the barcode display. The infrared receiver upon receiving a signal from the barcode reader sends a signal to the microprocessor requesting that the microprocessor send requested data for viewing on the barcode display. The displayed barcode is then read by the barcode reader. In such a manner, continually changing data collected by the sensors can be stored and retrieved as desired.

While a lot of research is on-going, there still exists need to provide IoT enabled method, device and system for the purposes of monitoring and analyse live parameter data of the materials under transportation from devices that forms the entire connectivity network.

SUMMARY OF THE INVENTION

U.S. patent application publication number US20100078482 pertains to monitoring device and method for monitoring a status of an item. Monitoring device includes an information display (2) arranged to display a data carrier (3) conveying a first status of an item, at least one sensor (4) arranged to detect at least one external stimulus, and a processor (8) arranged to process the detected at least one external stimulus to monitor the first status of the item.

Accordingly, the present invention there is provided an Internet of Things enabled method, device and system that are capable of remotely monitoring and controlling physical parameters of a material under transportation and/or storage. It demonstrates novel use of sensors (temperature, humidity, light, vibration, Gas (CO, CO2, H2), pH, etc) and barcode in the IoT technology in the field of chemical and biological material storage and transportation.

In accordance with an aspect of the invention, there is provided a packaging element for monitoring and reporting plurality of physical parameters to which the packaging element has been subjected, said packaging element comprising: a housing; plurality of sensors disposed on the housing for generating data representing the plurality physical parameters; a dynamic barcode generator adapted to generate an electronic barcode on basis of the data representing the plurality physical parameters; and an electronic bar code display device positioned on an external surface of the housing for displaying the electronic barcode.

In an embodiment of the invention, the packaging element may further comprise a processing unit operably coupled to the plurality of sensors, the processing unit being adapted to generate at least one trigger if at least one predetermined criterion is satisfied.

In an embodiment of the invention, the processing unit is adapted to generate a trigger if:
a. data generated by a particular sensor is outside a corresponding predetermined limit;
b. there is variation in data generated by at least one sensor;
c. an amount of variation in a data generated by at least one sensor is outside a corresponding predetermined limit.

In an embodiment of the invention, the dynamic barcode generator is operably coupled to the processing unit for receiving a trigger therefrom, the dynamic barcode generator being further adapted to include information pertaining to the trigger in a barcode.

In another embodiment of the invention, the processing unit is further adapted to recognize a pattern from the data generated by said at least one sensor.

In another embodiment of the invention, the dynamic barcode generator is operably coupled to the processing unit for receiving therefrom the pattern thus recognized, the dynamic barcode generator being further adapted to include information pertaining to the pattern in a barcode.

In another embodiment of the invention, the packaging element may further comprise a transmitter unit adapted to transmit the electronic barcode to an external device.

In accordance with another aspect of the invention, there is provided a device for monitoring and reporting plurality of physical parameters to which a packaging element has been subjected, said device comprising: a container adapted to receive the packaging element, the packaging element including an electronic bar code display device positioned on an external surface thereof and displaying an electronic barcode; an image capturing unit adapted to capture an image of the electronic barcode thus displayed by the electronic bar code display device positioned on the packaging element; and a transmitter unit adapted to transmit image of the electronic barcode thus captured or information derived therefrom to an external device.

In an aspect of the invention, the device may further comprise at least one sensor disposed on the container for generating data representing at least one physical parameter prevalent within the container.

In another aspect of the invention, the device may further comprise at least one physical parameter modifying unit adapted to modify at least one physical parameter prevalent within the container and a processing unit adapted to exercise control over said at least one physical parameter modifying unit.

In accordance with yet another aspect of the invention, there is provided a system for monitoring and reporting plurality of physical parameters to which a packaging element has been subjected. The system comprises a packaging element. The packaging element in turn comprises a housing; plurality of sensors disposed on the housing for generating data representing the plurality physical parameters; a dynamic barcode generator adapted to generate an electronic barcode on basis of the data representing the plurality physical parameters; and an electronic bar code display device positioned on an external surface of the housing for displaying the electronic barcode. The system further comprises an image capturing unit adapted to capture an image of the electronic barcode thus displayed by the electronic bar code display device positioned on the packaging element; and a transmitter unit adapted to transmit image of the electronic barcode thus captured or information derived therefrom to an external device.

In an aspect of the invention, the image capturing unit and the transmitter unit form part of a handheld processing device.

The invention further provides a method for remotely monitoring and controlling physical parameters of a material under transportation in a container, said method comprising: measuring various physical parameters related to said material and inside said container by means of plurality of sensors; receiving data from said plurality sensors and visually displaying changes in said physical parameters by means of a dynamic barcode; receiving, storing data from said plurality of sensors and deciding an action to be taken by means of a processing unit if physical parameters of said container and said material; and controlling said parameters of said material and within said container by means of at least one physical parameter modifying unit based on instructions received from said processing unit.

DETAILED DESCRIPTION OF THE INVENTION

In accordance with an aspect of the invention, there is provided a packaging element for monitoring and reporting plurality of physical parameters to which the packaging element has been subjected, said packaging element comprising: a housing; plurality of sensors disposed on the housing for generating data representing the plurality physical parameters; a dynamic barcode generator adapted to generate an electronic barcode on basis of the data representing the plurality physical parameters; and an electronic bar code display device positioned on an external surface of the housing for displaying the electronic barcode.

In an embodiment of the invention, the packaging element may further comprise a processing unit operably coupled to the plurality of sensors, the processing unit being adapted to generate at least one trigger if at least one predetermined criterion is satisfied.

In an embodiment of the invention, the processing unit is adapted to generate a trigger if:
data generated by a particular sensor is outside a corresponding predetermined limit;
there is variation in data generated by at least one sensor;
an amount of variation in a data generated by at least one sensor is outside a corresponding predetermined limit.

In an embodiment of the invention, the dynamic barcode generator is operably coupled to the processing unit for receiving a trigger therefrom, the dynamic barcode generator being further adapted to include information pertaining to the trigger in a barcode.

In another embodiment of the invention, the processing unit is further adapted to recognize a pattern from the data generated by said at least one sensor. For the purposes of recognizing pattern in the data, an artificial intelligence (AI) model may be incorporated in the processing unit. The AI model may be pre-trained.

In another embodiment of the invention, the dynamic barcode generator is operably coupled to the processing unit for receiving therefrom the pattern thus recognized, the dynamic barcode generator being further adapted to include information pertaining to the pattern in a barcode.

In another embodiment of the invention, the packaging element may further comprise a transmitter unit adapted to transmit the electronic barcode to an external device.

In accordance with another aspect of the invention, there is provided a device for monitoring and reporting plurality of physical parameters to which a packaging element has been subjected, said device comprising: a container adapted to receive the packaging element, the packaging element including an electronic bar code display device positioned on an external surface thereof and displaying an electronic barcode; an image capturing unit adapted to capture an image of the electronic barcode thus displayed by the electronic bar code display device positioned on the packaging element; and a transmitter unit adapted to transmit image of the electronic barcode thus captured or information derived therefrom to an external device.

In an aspect of the invention, the device may further comprise at least one sensor disposed on the container for generating data representing at least one physical parameter prevalent within the container.

In another aspect of the invention, the device may further comprise at least one physical parameter modifying unit adapted to modify at least one physical parameter prevalent within the container and a processing unit adapted to exercise control over said at least one physical parameter modifying unit.

In accordance with yet another aspect of the invention, there is provided a system for monitoring and reporting plurality of physical parameters to which a packaging element has been subjected. The system comprises a packaging element. The packaging element in turn comprises a housing; plurality of sensors disposed on the housing for generating data representing the plurality physical parameters; a dynamic barcode generator adapted to generate an electronic barcode on basis of the data representing the plurality physical parameters; and an electronic bar code display device positioned on an external surface of the housing for displaying the electronic barcode. The system further comprises an image capturing unit adapted to capture an image of the electronic barcode thus displayed by the electronic bar code display device positioned on the packaging element; and a transmitter unit adapted to transmit image of the electronic barcode thus captured or information derived therefrom to an external device.

In an aspect of the invention, the image capturing unit and the transmitter unit form part of a handheld processing device.

According to an aspect of the invention, there is provided a system capable of remotely monitoring and controlling physical parameters of a material under transportation in a container and/or storage. In an aspect of the invention, plurality of sensors are attached to said container to measure various physical parameters related to said material and said container.

In an aspect of the invention, display device is provided to depict a dynamic barcode/QR code. The dynamic barcode/QR code indicates a change in any of the physical parameters, wherein the barcode provides different visual displays for change in physical parameters, enabling the system to read the physical parameters.

In an aspect of the invention, a remote central server is provided to store data of said physical parameters measured by said plurality of sensors.

Based on the data thus read, the system can exert a control action. In particular, a control system is incorporated within said container to control said parameters of the material/container under transportation and/or storage.

There may be provided a first rechargeable energy source to power said plurality of sensors. Additionally, there may be provided a second rechargeable energy source to power said monitoring system.

In an embodiment of the invention, the physical parameters to be measured are temperature, humidity, pH and the like.

In another embodiment of the invention, the pluralities of sensors are selected from a web camera, temperature sensor, pressure sensor, pH sensor, heat sensor.

In yet another embodiment of the invention, the Barcoded data is read by a web camera for interpretation and actions.

In still another embodiment of the invention, a temperature inside said container is measured by said temperature sensor.

In a further embodiment of the invention, a pressure inside said container and onto said material is measured by said pressure sensor.

In a further embodiment of the invention, a pH of said material is measured by said pH sensor.

In a further embodiment of the invention, a humidity surrounding said material inside said container is measured by a humidity sensor.

In a further embodiment of the invention, data pertaining to the parameters is wirelessly received by said remote server from said plurality of sensors.

In a further embodiment of the invention, said parameters inside said container and surrounding said material is wirelessly controlled by said control system through instructions received from said remote server.

In a further embodiment of the invention, said system is monitored and controlled through Internet of Things (IoT).

In an aspect of the invention, the material being transported or stored is chemical material. In another of the invention, the material being transported or stored is biological material.

In an embodiment, the system comprises plurality of sensors attached to the container to measure various physical parameters related to the material and the container; cooling system incorporated within the container to control the temperature of the material/container under transportation; a remote central server/mobile device to store the data of the physical parameters measured by the plurality of sensors; a first rechargeable energy source to power the plurality of sensors, wherein the energy source is charged remotely; a second rechargeable energy source to power the cooling system; wherein the energy source is charged remotely; a dynamic barcode indicating a change in physical parameters, wherein the barcode provides different visual displays for change in physical parameters, enabling the system to control the physical parameters. The physical parameters to be measured are temperature, humidity, pH and the like. Plurality of sensors is may be a web camera inside the container.

The invention furthermore provides a method for remotely monitoring and controlling physical parameters of a material under transportation in a container and/or storage.

In an aspect of the invention, the method comprises the step of measuring various physical parameters related to said material and inside said container by means of plurality of sensors. Data from said plurality sensors is received by a processing unit in form of a dynamic barcode or QR code. The dynamic barcode or QR code visually displays changes in said physical parameters.

The dynamic barcode or QR code may optionally be stored. Data as contained in the dynamic barcode or QR code is then read out (to obtain the data from said plurality of sensors) and analyzed. Based on the analysis, an action to be taken can be decided by the processing unit if physical parameters of said container and/or said material are not in accordance with predetermined at least one predetermined criterion. In an embodiment of the invention, the processing unit may be located in close proximity to a location where the measurements are being made. By way of a non-limiting example, the processing unit may be located on the container. In an embodiment of the invention, the processing unit may be located in remote with respect to the location where the measurements are being made. By way of a non-limiting example, the processing unit may be a remote central server.

In case physical parameters of said container and/or said material are not in accordance with predetermined at least one predetermined criterion, the processing unit may control said parameters of said material within said container by means of at least one physical parameter modifying unit. In this regard, the processing unit may send instructions to the physical parameter modifying unit.

By way of a non-limiting example, if a temperature of the material or a temperature within the container is increasing, the processing unit may exert control over a cooling system, as may be provided in the container or in location where the container is stored. By way of another non-limiting example, if a pressure within the container is increasing, the processing unit may exert control over a venting system to bring the pressure within the desired range. By way of yet another non-limiting example, if humidity within the container is increasing, the processing unit may exert control over a de-humidifying system to bring the pressure within the desired range. By way of yet another non-limiting example, if a concentration of a particular type of gas is increasing, the processing unit may exert control a scrubber unit (or an absorbing unit) that absorbs the particular type of gas, to thereby bring the concentration of the particular gas within the desired range.

In an embodiment of the invention, the physical parameters to be measured are temperature, humidity, pH and the like Gas Sensors.

In the most preferred aspect the present invention provides a method for continuously monitoring the health of the material by sensors such as temperature, light, sound, vibration etc. The live data obtained from the biomedical devices may be applied in the field of big data analytics. The three main components of the present system include monitor, response and control of parameters. The present disclosure describes the design and deployment of the remote sensor which as mentioned here, may be, but not limited to a single node or a cluster of nodes or a multi-node and multi-instance to monitor live data and respond with the resultant environment and metadata. The disclosure provides details on the temperature monitoring action for online data management which is used to assess the parameters or the data. It details on the central remote data management infrastructure and elucidates the type of response raised by the sensor for handling any type of tasks related to trigger response. The response is timed based on the device status with respect to its environment, is immediate if it detects a small spike and any non-compliance with the standard inbuilt AI models, thereby tagging a dynamic barcode for visualization.

In another aspect of the invention it provides the user the flexibility to monitor any parameter chosen and monitor the data or results on the fly without technical expertise.

In yet another aspect the entire sensor workflow is fully automated, and measured against a time performance analysis. It constitutes a portable platform and can make use of multiple devices both at client and service side of the IOT architecture.

The present invention discloses a system capable of remotely monitoring and controlling physical parameters of a material under transportation in an container comprising: plurality of sensors attached to the container to measure various physical parameters related to the material and the container; cooling system incorporated within the container to control the temperature of the material/container under transportation; a remote central server/mobile device to store the data of the physical parameters measured by the plurality of sensors; a first rechargeable energy source to power the plurality of sensors, wherein the energy source is charged remotely; a second rechargeable energy source to power the cooling system; wherein the energy source is charged remotely; a dynamic barcode indicating a change in physical parameters, wherein the barcode provides different visual displays for change in physical parameters, enabling the system to control the physical parameters. The physical parameters to be measured are temperature, humidity, pH and the like. Plurality of sensors is may be a web camera inside the container.

The invention will now be described in detail in connection with certain preferred and optional embodiments, so that various aspects thereof may be more fully understood and appreciated.

The invention discusses about an integrated sensor based device.

Figure 1:
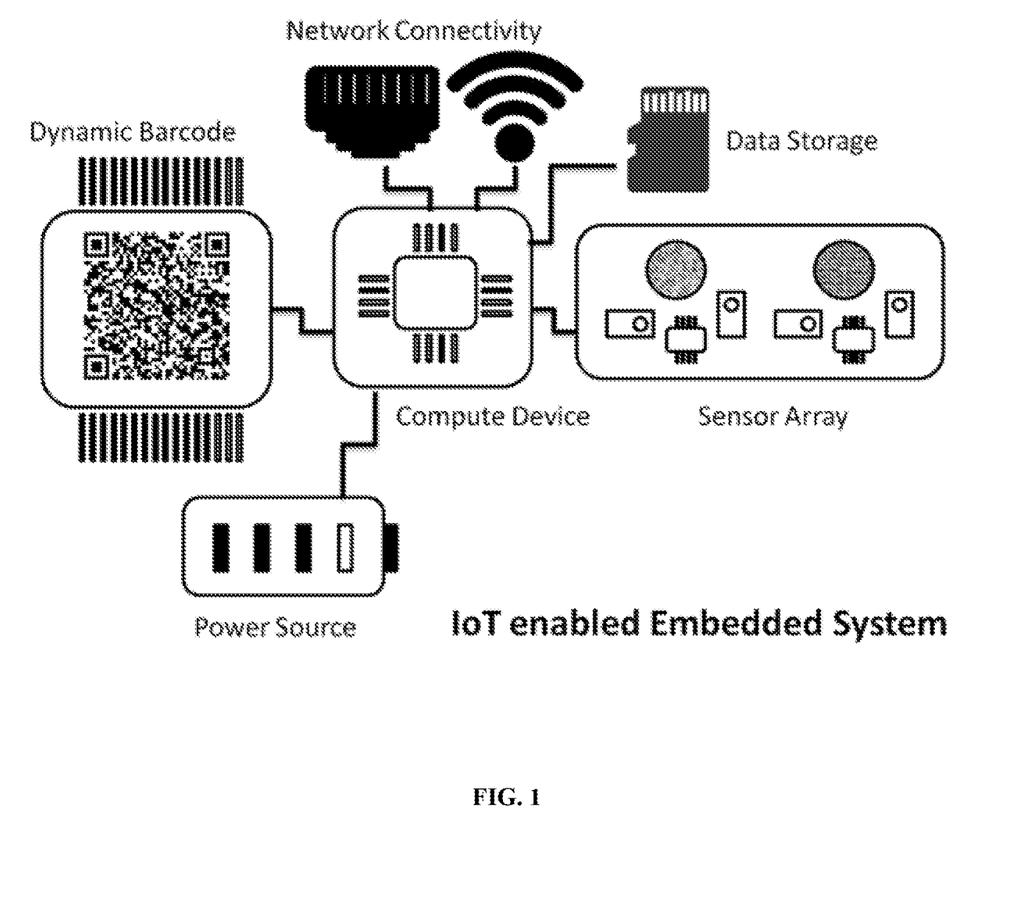
FIG. 1 illustrates an integrated chip with sensors with storage (1×1 cm) which is IoT enabled built in accordance with an embodiment of the invention.

FIG. 1, shows the device setup for regularly monitoring the parameters in a system here represented by a glass beaker connected to various sensors including webcam. The system maintains updates and archive data received from the sensors to a remote control. The setup will possess dynamic features for data submission, large scale data(results) retrieval, parameter data status logs, data archive log, uploading information to the control, authorization code etc.

Model I: Natural Cooling
Model II: Natural Heating
Model III: Thermal Shock (HT: High Temperature: LT: Low Temperature)
Model IV: Controlled Environment
Model V: Adverse conditions model
Model VI: Model Control response.

A repository of most of the sensor data obtained will be fed into the ready to use system MI base for better prediction in the future. The method can be extended to activate pacemaker devices remotely in a hospital setting.

The present invention is a comprehensive and well defined resource of remote monitoring of live data from sensor based devices to make an informed decision for course correction.

It can monitor the health of the material by continuously monitoring important parameters via sensors. The system comprises plurality of sensor and the said plurality of sensor is selected from a web camera, temperature sensor, pressure sensor, pH sensor, heat sensor etc. The system enables, not only log information, but also understands patterns and can be viewed transmitted online using IOT. The continuous monitoring of parameters of the device/material under normal conditions and also in extreme and sealed conditions can be performed using this method. The potential applications are in the field of petrochemicals, biological and other sensitive materials domain. Further it can be extended to any task that requires careful and continuous scrutiny of the parameters remotely The potential applications are envisaged in the domain of pharmaceutical, vaccine development, cancer cell line, blood transport, research laboratories, hospitals.

Figure 2:
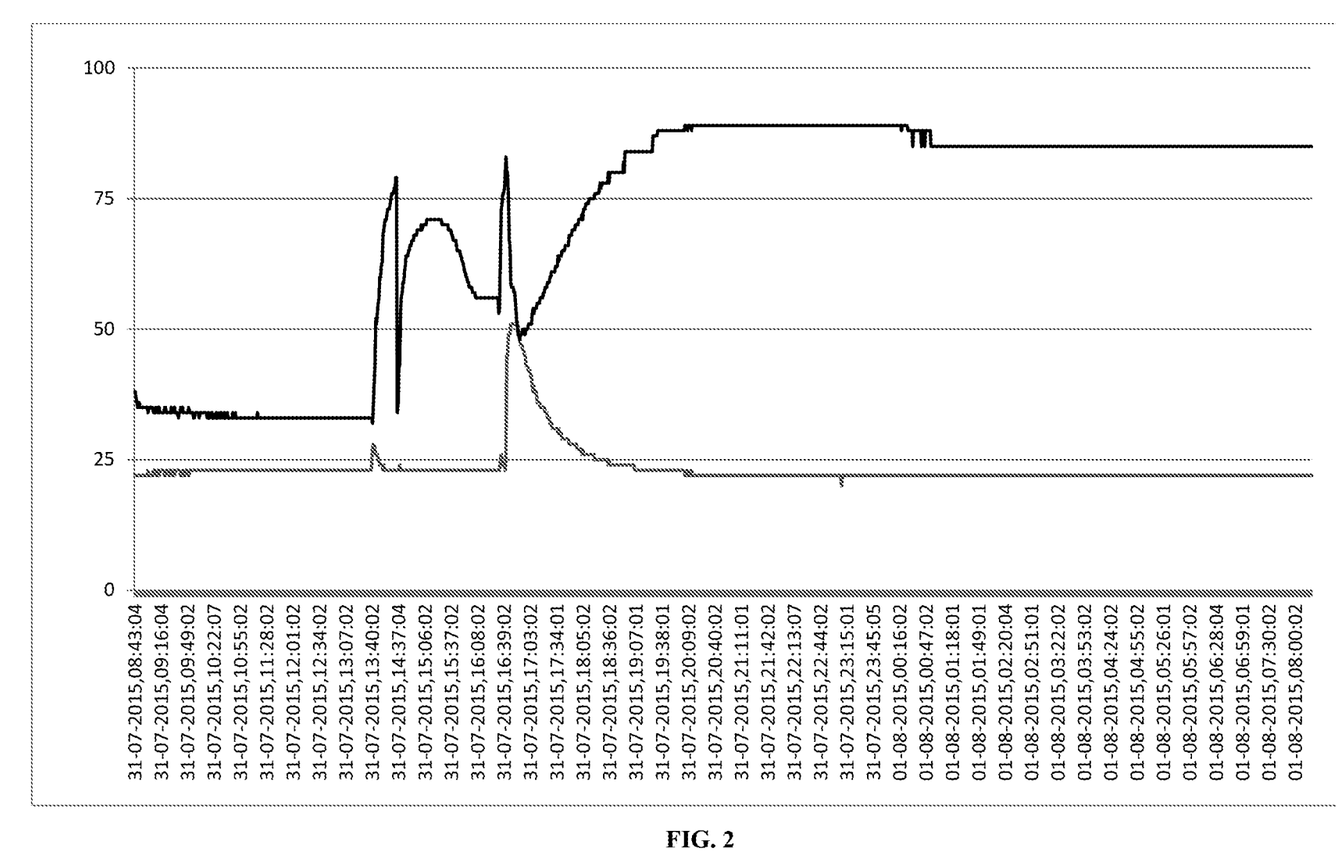
FIG. 2 illustrates recognition of thermal shock pattern for modelling, simulation and response system.
Figure 3:
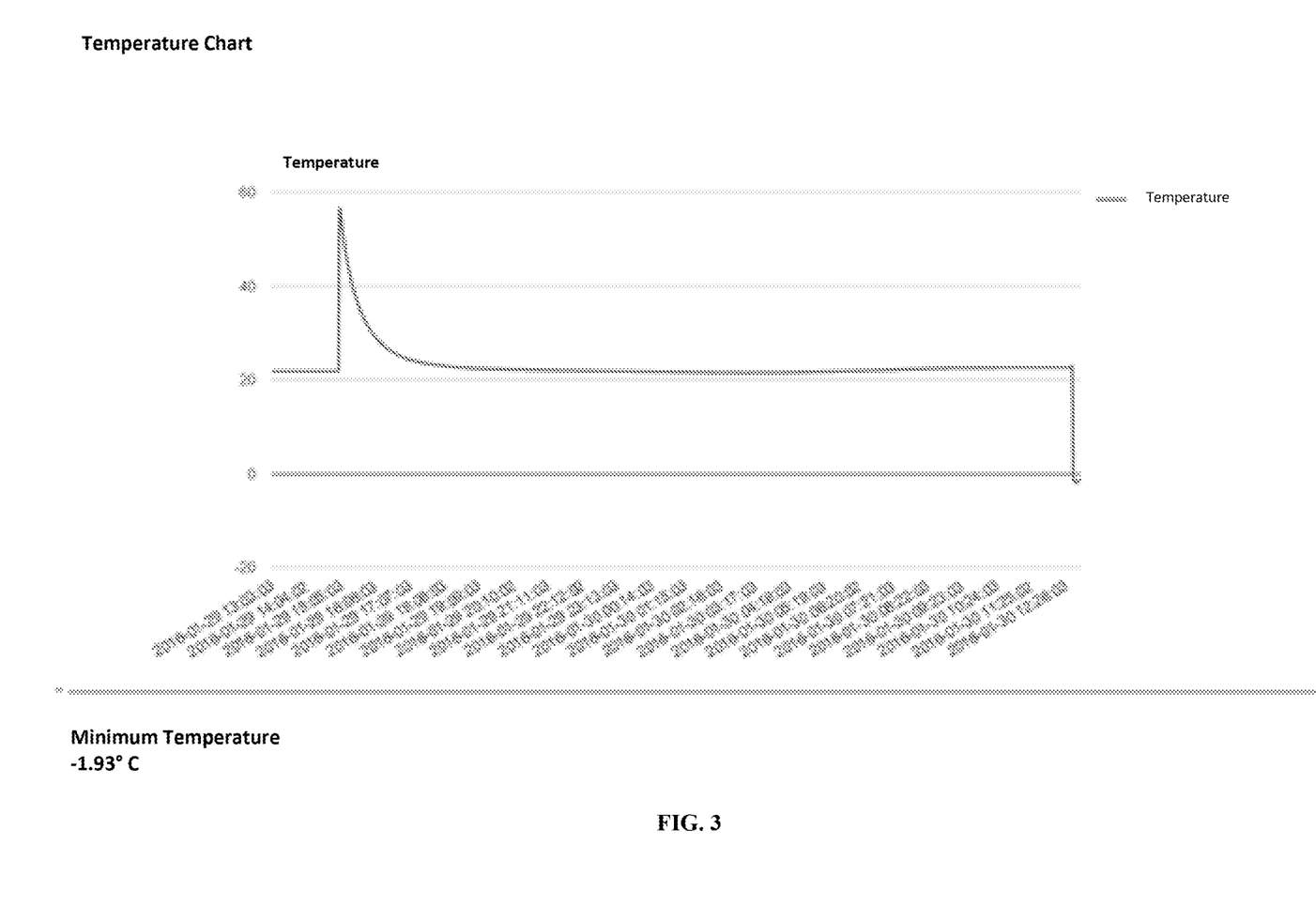
FIG. 3 illustrates the temperature high (above ambient temperature) and low (sub zero temperature) for calibration of the system.
Figure 4:
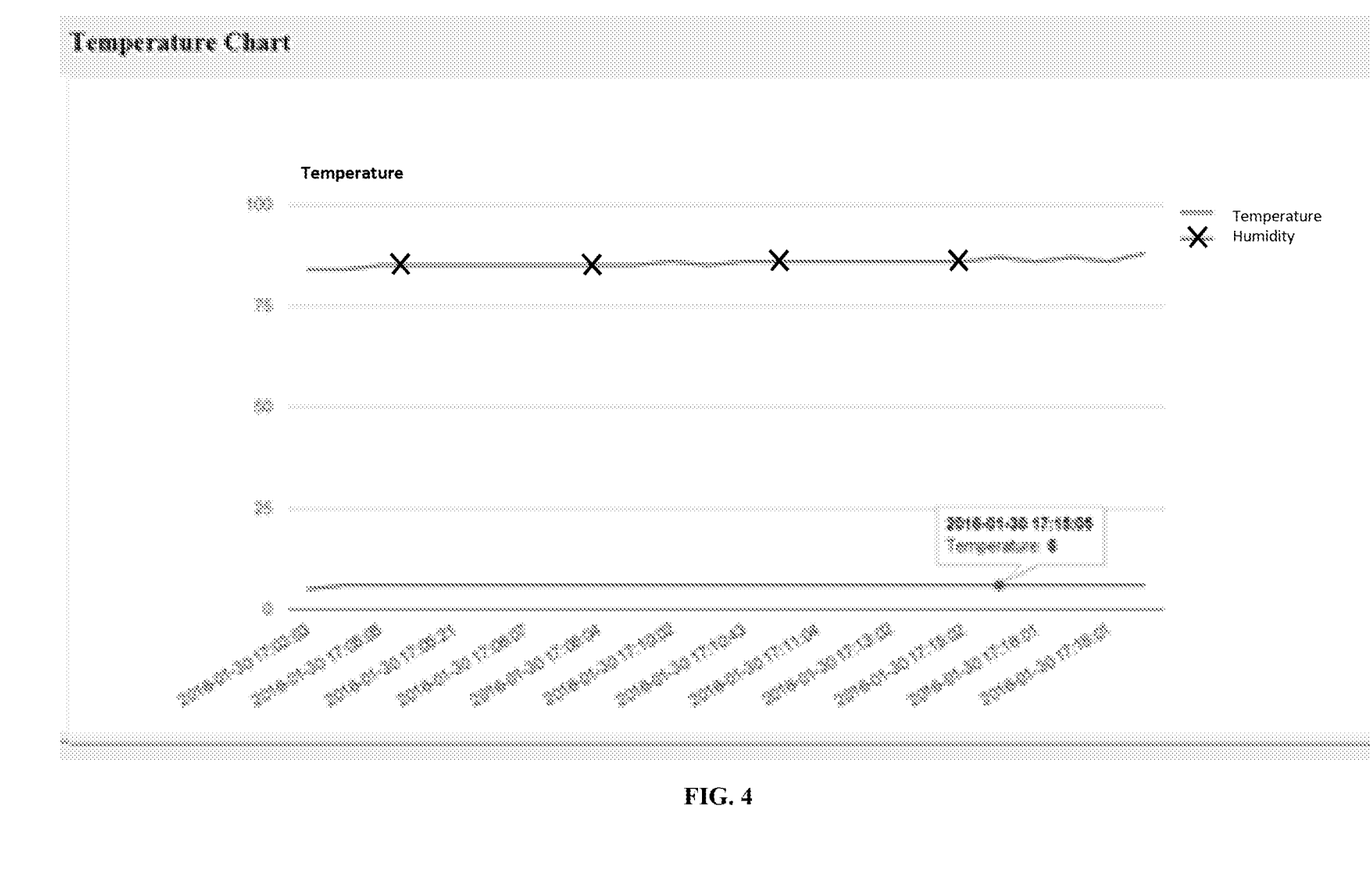
FIG. 4 illustrates the time series data on combined observation of Temperature and Humidity under cooling condition.
Figure 5:
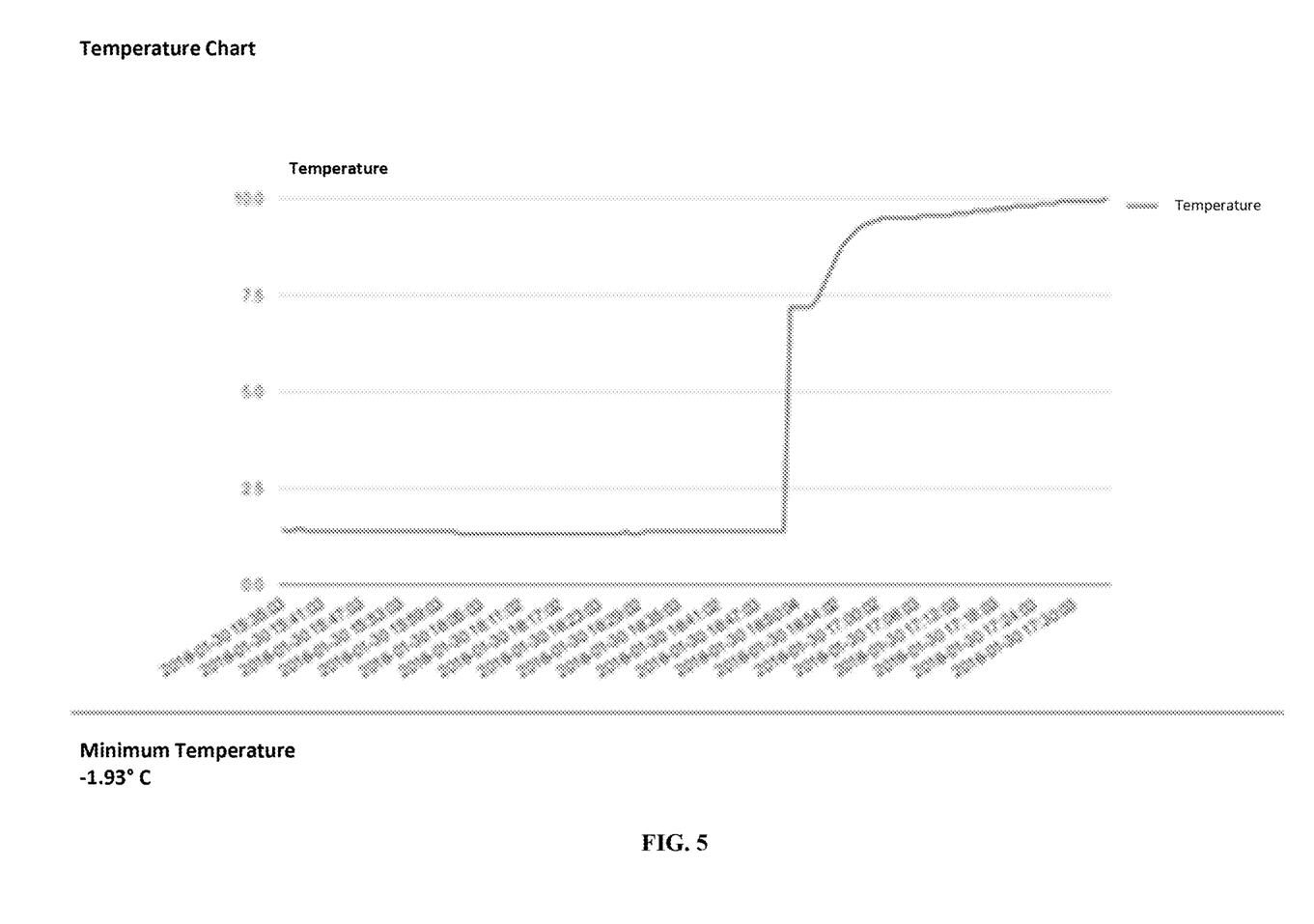
FIG. 5 illustrates the Temperature sensing pattern: Thermal shock pattern (for modelling, simulation and control system).
Figure 6:
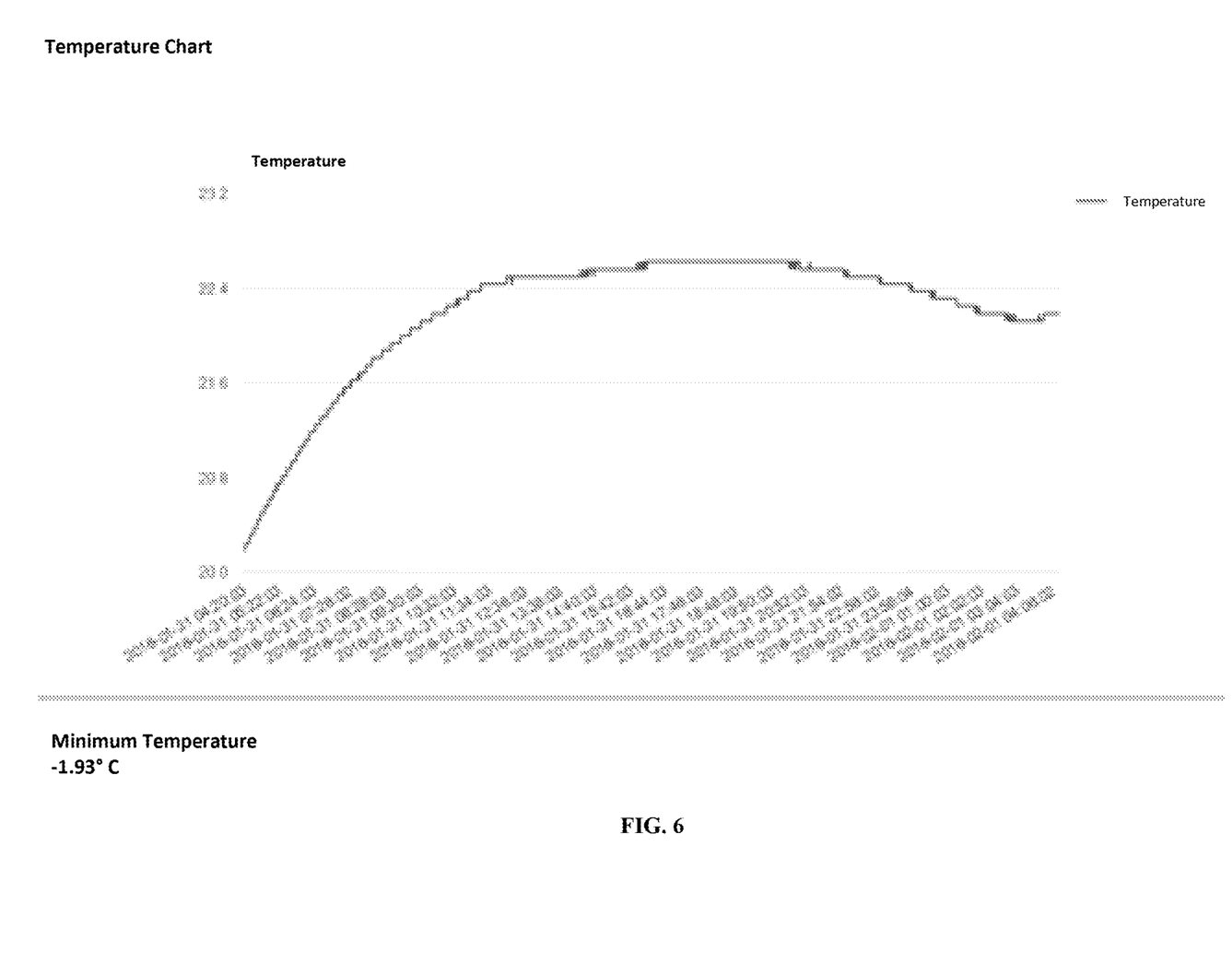
FIG. 6 illustrates temperature (low to high: Natural heating pattern).
Figure 7:
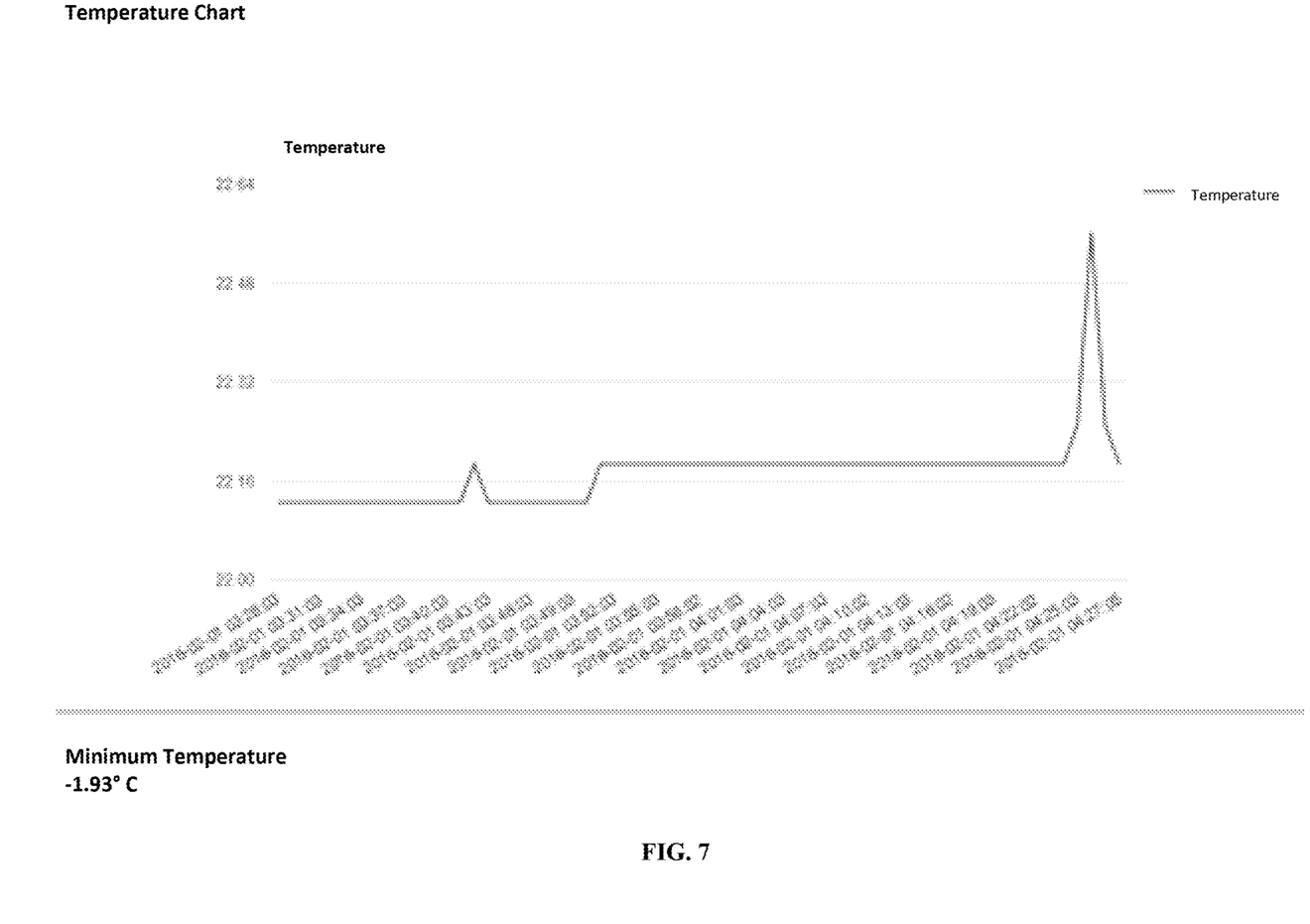
FIG. 7 illustrates the thermal shock observation with minimum perturbation and high sensitivity for modelling and control the system.
Figure 8:
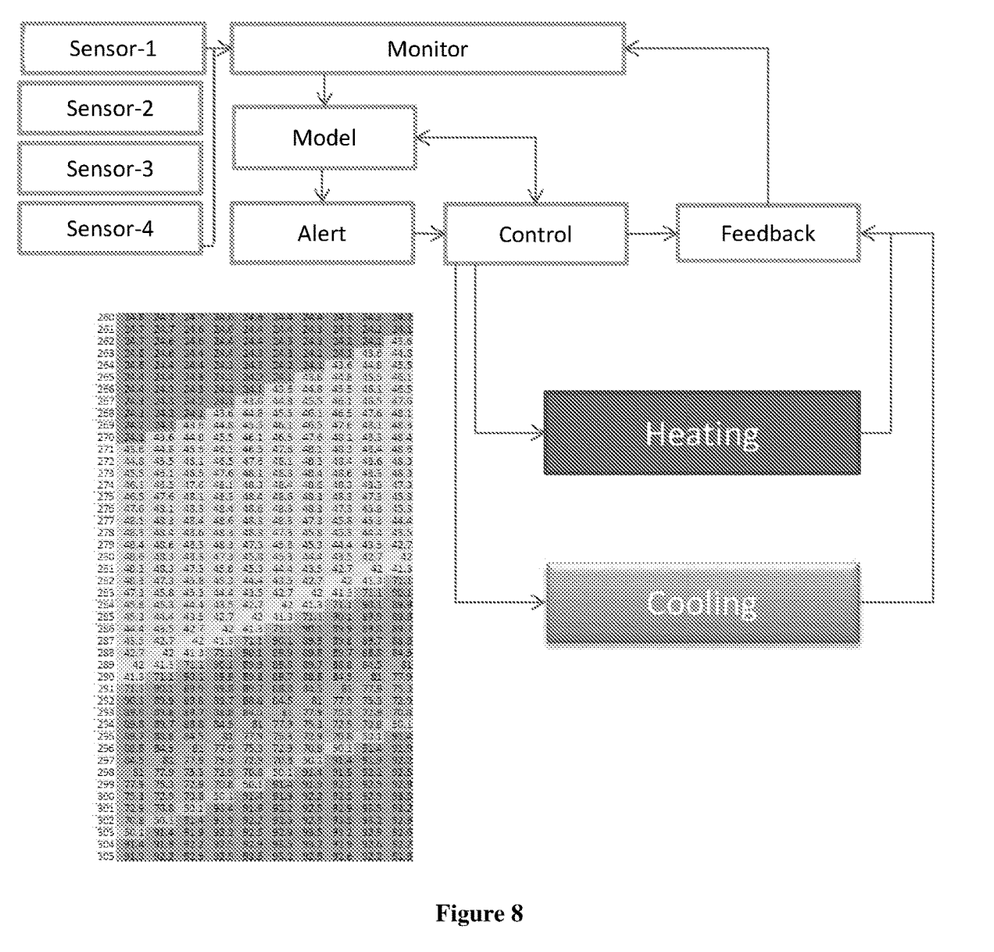
FIG. 8 illustrates a block diagram of a system in accordance with the teachings of the present invention.
Figure 9:
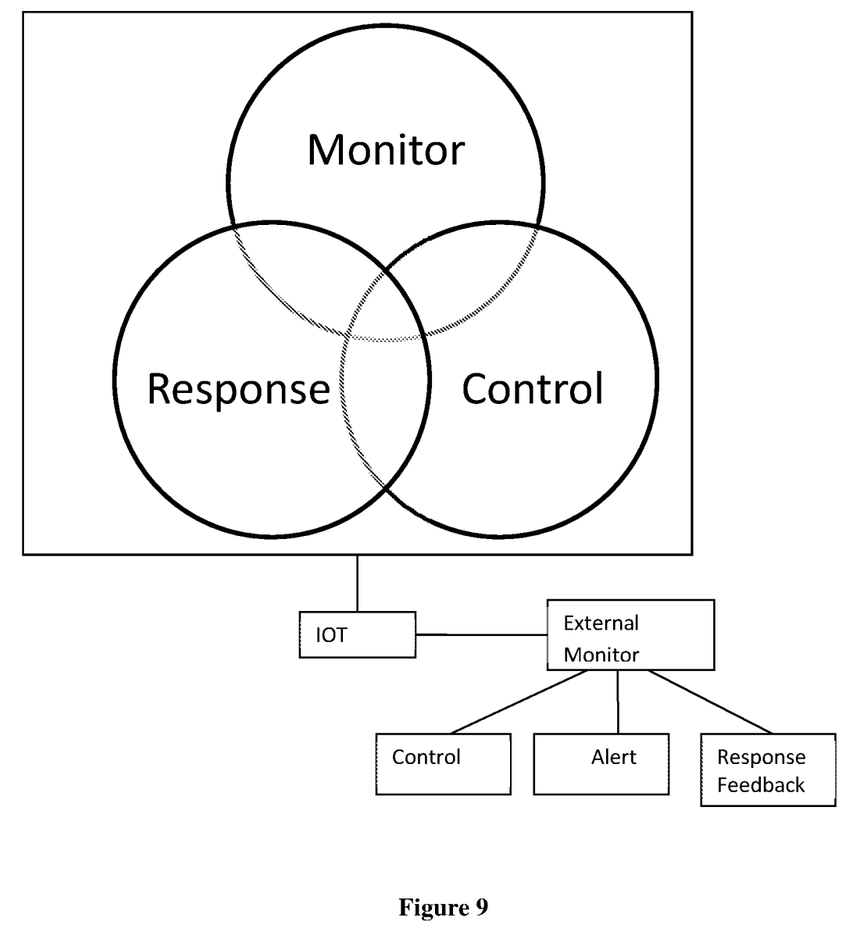
FIG. 9 illustrates a schematic diagram of the basic organization of the said device.

The system is provided with a dynamic barcode that transmits a short electronic message similar to a Short Service Message paradigm using various electronic devices such as hand held devices, smartphones, laptops, desktop computers, tablets to a remote control system, the message as such consists a semi structured code or information or action tags which will be deciphered in the live data context. The response thus initiated could take one of the two modes implemented in the system which is the standalone subsystem the remote sensor server. The decision to switch to either sub-system is taken after the decoding of the action tags or the content of the messages received from the AI model. The AI model may be pre-trained. In this regard, reference may be made to the FIG. 2, which shows a first sample set that is for the purposes of training the AI model. Also, reference may be made to FIG. 3 which shows a second data set indicative of temperature high (above ambient temperature) and low (sub-zero temperature) which be used for calibrating the system. Also, reference may be made to FIG. 4 which illustrates a time series data on combined observation of Temperature and Humidity under cooling condition that can be used for training the AI model. Further, reference may be made to FIG. 5 which illustrates the Temperature sensing pattern for Thermal shock pattern (for modelling, simulation and control system). Further reference may be made to FIG. 6 which illustrates temperature (low to high: Natural heating pattern) for training the AI model. Further reference may be made to FIG. 7 which illustrates the thermal shock observation with minimum perturbation and high sensitivity for modelling and control the system. It may be however noted that the AI model may be trained using different sets of training data. Also, it may be noted that while in the above cases the training data pertains to temperature and humidity, data representing other types of parameters may be used for training the AI model.

The data generated as part of the result of the running jobs is compressed and uploaded on a backup space server of which a public link or restricted link is generated for the user or supplier for effective control. The method, system and apparatus discussed herein are thus the prototype of the successful implementation of multiple sensors in a single integrated platform over an internet network for efficient monitoring and control.

EXAMPLES

Data Sample
CSIR@NCL\nAT23.67\nH45.67\nPH6.78\
nLT28.92\nVC15.05\nTS0304171230_30\nATM X8.00-ATMN1.50\nHMX10.00-HMN5.00\nLTMX5.00-LTMN2.00\nVCMX15.0-VCMN5.0

A sample dynamic barcode generated by the packaging element is shown in FIG. 1. The data encoded in the barcode (FIG. 1) describes the organizational ID (CSIR@NCL).

The dynamic barcode further indicates that current Ambient Temperature, as sensed by a temperature sensor, has a value of 23.67° C. (as represented by "nAT23.67"). The dynamic barcode further indicates that the current humidity level has a value of 45.67% (as represented by "nH45.67"); the current pH level has a value of 6.78 (as represented by "nPH6.78"); the current liquid temperature has a value of 28.92° C. (as represented by "nLT28.92"); the current level of volatile contents is 15.5 (as represented by "nVC15.05").

The dynamic barcode may further include a time stamp (in dd-mm-yy-hh-mm_ss format) indicating the current time, as represented by "nTS0304171230_30".

Apart from the above, the dynamic barcode further more provides the range of data that can be used either for alert purposes or for activate a solution to control the system. In this regard, "nATMX8.00-ATMN1.50" indicates that the Ambient Temperature should be maintained between a Maximum Ambient Temperature of 8° C. and a Minimum Ambient Temperature was −1.5° C. If Ambient Temperature at any point of time falls outside the prescribed range of 8 to −1.5, an alert condition is prevailing and a corrective action may need to be implemented.

Likewise, "nHMX10.00-HMN5.00" indicates that the Humidity should be maintained between a Maximum of 10% and a Minimum of 5%. If Humidity at any point of time falls outside the prescribed range of 5 to 10%, an alert condition is prevailing and a corrective action may need to be implemented.

Likewise, "nLTMX5.00-LTMN2.00" indicates that the liquid temperature should be maintained between a Maximum of 5° C. and a Minimum of 2° C. If liquid temperature at any point of time falls outside the prescribed range of 2° C. to 5° C., an alert condition is prevailing and a corrective action may need to be implemented.

Likewise, "nVCMX15.0-VCMN5.0" indicates that the volatile content's level should be maintained between a Maximum of 15 and a Minimum of 5. If volatile content's level at any point of time falls outside the prescribed range of 5 to 15, an alert condition is prevailing and a corrective action may need to be implemented.

Thus, it can be observed that by reading the dynamic barcode and reading the content thereof, it is possible to arrive at the following conclusions:
the current Ambient Temperature is beyond the prescribed range. Hence, a trigger (or alert signal) should be generated. In addition, a cooling system has to be switched ON to bring the Ambient Temperature within the prescribed range;
the current humidity level is beyond the prescribed value. Hence, a trigger should be generated. In addition, a humidity controlling device has to be switched ON to bring the Ambient Temperature within the prescribed range;
the current liquid temperature is beyond the prescribed range. Hence, a trigger (or alert signal) should be generated. In addition, a cooling system (which may be same or different from the one used for controlling the ambient temperature) has to be switched ON to bring the liquid temperature within the prescribed range; and
the current level of volatile content is beyond the prescribed range. Hence, a trigger (or alert signal) should be generated. In addition, a unit which controls the level of volatile content has to be switched ON to bring the level of volatile content within the prescribed range.

It may be noted that it is not essential to define an alert condition or a criterion for invoking a corrective action in respect of each physical parameter that can be measured. It can be seen in the above example, that while pH value is being measured and depicted in the barcode, an alert condition or a criterion for invoking a corrective action are not defined.

Advantages of the Invention

The invention enables to continuously monitor the health of the material under transportation, i.e. constantly monitoring environmental parameters related to the chemical or biological material under transportation.

The present invention can not only log information, but also understand patterns and can be viewed and transmitted using IOT technology.

The invention enhances the sensor with decision making abilities. Whenever there is a minute change in any of the parameters the sensor can notify an alert to the main control.

The invention enables the tracking to be performed with the aid of dynamic data that can be viewed in a barcode format on the container.

The invention claimed is:
1. A packaging element for monitoring and reporting a plurality of physical parameters to which the packaging element has been subjected, said packaging element comprising:
a housing;
a plurality of sensors disposed on the housing for generating data representing the plurality of physical parameters;
a processing unit operably coupled to the plurality of sensors, the processing unit being adapted to generate:
at least one trigger based on at least one of:
data generated by a particular sensor is outside a corresponding predetermined limit;
a variation is determined in data generated by at least one sensor; and
an amount of the determined variation is outside a corresponding predetermined limit; and
a safe range of data corresponding to each of the plurality of physical parameters for alerting and activating a corrective-action to a control system;
a dynamic barcode generator adapted to generate an electronic barcode based on said trigger from the processing unit, wherein the barcode indicates a current measured value of each of the plurality of physical parameters and the safe range of the data corresponding to each of the plurality of physical parameters; and an electronic bar code display device positioned on an external surface of the housing for displaying the electronic barcode, wherein the processing unit is in communication with at least one physical parameter modifying unit adapted to modify at least one physical parameter and the processing unit is adapted to exercise control over said at least one physical parameter modifying unit while the packaging element is within a container.

2. The packaging element as claimed in claim 1, wherein the processing unit is further adapted to recognize a pattern from the data generated by said at least one sensor.

3. The packaging element as claimed in claim 1, wherein the dynamic barcode generator is operably coupled to the processing unit for receiving the pattern thus recognized, the dynamic barcode generator being further adapted to include information pertaining to the pattern in a barcode.

4. The packaging element as claimed in claim 1, further comprising a transmitter unit adapted to transmit the electronic barcode to an external device.

5. A device for monitoring and reporting plurality of physical parameters to which a packaging element has been subjected, said device comprising:
   a container adapted to receive the packaging element, the packaging element including:
      a plurality of sensors disposed for generating data representing the plurality of physical parameters pertaining to the container;
      a processing unit operably coupled to the plurality of sensors, the processing unit being adapted to generate:
         at least one trigger based on at least one of:
            data generated by a particular sensor is outside a corresponding predetermined limit;
            there is variation in data generated by at least one sensor; and
            an amount of variation in a data generated by at least one sensor is outside a corresponding predetermined limit; and
         a safe range of data corresponding to each of the plurality of physical parameters for alerting and activating a corrective action to control system;
      a dynamic barcode generator adapted to generate an electronic barcode based on said trigger from the processing unit, wherein the barcode indicates a current measured value of each of the plurality of physical parameters and the safe range of the data corresponding to each of the plurality of physical parameters; and
      an electronic bar code display device positioned on an external surface thereof and displaying the electronic barcode;
   an image capturing unit adapted to capture an image of the electronic barcode thus displayed by the electronic bar code display device positioned on the packaging element;
   a transmitter unit adapted to transmit the image of the electronic barcode thus captured or information derived therefrom to an external device; and
   at least one physical parameter modifying unit adapted to modify at least one physical parameter prevalent within the container and the processing unit is adapted to exercise control over said at least one physical parameter modifying unit.

6. The device as claimed in claim 5, further comprising at least one sensor disposed on the container for generating data representing the at least one physical parameter prevalent within the container.

7. A system for monitoring and reporting plurality of physical parameters to which a packaging element has been subjected, said system comprising:
   a packaging element comprising:
      a housing;
      a plurality of sensors disposed on the housing for generating data representing the plurality physical parameters;
      a processing unit operably coupled to the plurality of sensors, the processing unit being adapted to generate:
         at least one trigger based on at least one of:
            data generated by a particular sensor is outside a corresponding predetermined limit;
            there is variation in data generated by at least one sensor; and
            an amount of variation in a data generated by at least one sensor is outside a corresponding predetermined limit;
         a safe range of data corresponding to each of the plurality of physical parameters for alerting and activating a corrective action to control system;
      a dynamic barcode generator adapted to generate an electronic barcode based on said trigger from the processing unit, wherein the barcode indicates a current measured value of each of the plurality of physical parameters and the safe range of the data corresponding to each of the plurality of physical parameters;
      an electronic bar code display device positioned on an external surface of the housing for displaying the electronic barcode;
   an image capturing unit adapted to capture an image of the electronic barcode thus displayed by the electronic bar code display device positioned on the packaging element;
   a transmitter unit adapted to transmit the image of the electronic barcode thus captured or information derived therefrom to an external device; and
   at least one physical parameter modifying unit adapted to modify at least one physical parameter prevalent within the container and the processing unit is adapted to exercise control over said at least one physical parameter modifying unit.

8. The system as claimed in claim 7, wherein the image capturing unit and the transmitter unit form part of a handheld processing device.

9. A method for remotely monitoring and controlling physical parameters of a material under transportation in a container, said method comprising:
   measuring various physical parameters related to said material and inside said container by means of plurality of sensors;
   generating at least one trigger if at least one predetermined-criterion is satisfied with respect to said physical parameters;
   providing a safe range of data corresponding to each of the physical parameters for alerting and activating a corrective action to control system;
   receiving data from said plurality sensors and visually displaying:

changes in said physical parameters and;
the safe range of data corresponding to each of the physical parameters by means of a dynamic barcode based on received trigger;

receiving data from said plurality of sensors and deciding an action to be taken by means of a processing unit based on at least one of:
physical parameters of said container and/or said material not being in accordance with another at least one predetermined criterion; and
presence of said safe range of data corresponding to each of the physical parameters and a current measured value of each of the of physical parameters within the generated barcode; and controlling said physical parameters of said material within said container by means of at least one physical parameter modifying unit based on instructions received from said processing unit.

* * * * *